UNITED STATES PATENT OFFICE.

JESSE W. WAGNER, OF KANSAS CITY, KANSAS.

ARTIFICIAL STONE.

1,130,223.  Specification of Letters Patent.  Patented Mar. 2, 1915.

No Drawing.   Application filed June 14, 1913. Serial No. 773,731.

*To all whom it may concern:*

Be it known that I, JESSE W. WAGNER, a citizen of the United States, residing at Kansas City, in the county of Wyandotte and State of Kansas, have invented certain new and useful Improvements in Artificial Stone, of which the following is a specification.

The present invention relates to the production of artificial tomb stones, railings, etc., from a plastic compound, and my object is to produce a compound of this character, which after being cast or molded in the desired form is impervious to moisture and will not disintegrate in cold weather.

In carrying out the invention, I mix the following ingredients in substantially the proportions specified:

| | |
|---|---|
| Asbestos fiber | 15 lbs. |
| Ground asbestos | 235 " |
| Grease | 16 " |
| Ground mussel shells | 6 " |
| Hemp fiber | $\frac{1}{2}$ " |
| Glue | 1 " |
| Portland cement | 150 " |

The ground asbestos and the Portland cement constitute the main body portion of the compound, while the asbestos fiber and the hemp fiber constitute a binder for holding the body portion together and preventing any cracking or breaking up of the finished product. The ground asbestos also renders the compound fire-proof. The grease renders the composition water-proof, and the glue keeps said grease from being drawn to the surface during warm weather by capillary attraction while the composition is hardening. The ground mussel shells are employed principally as a decorative feature. A sufficient quantity of water is added to the ingredients to make the compound plastic and to cause the cement to set in the usual manner. The plastic compound is then molded in the desired shape and permitted to harden. The tomb stones or other shapes which are molded as above set forth, have the advantage of being frost-proof and of not absorbing water, so that they are not subject to disintegration in cold weather, and do not increase in weight during moist weather.

In the preferred form of forming the compound, the hemp fiber, the Portland cement, the mussel shells, and the glue, which has been previously dissolved in water, are mixed in the required proportions. The asbestos fiber, the ground asbestos, and the grease are then added, the grease first being heated to a boiling state so that it will thoroughly permeate the compound, and the whole is thoroughly mixed together. Water is then added to render the composition sufficiently plastic to be molded into any desired form. Any desired coloring matter may be added.

When desired, the composition may be employed as a stucco over a hollow core, instead of being molded in solid form.

Having thus described my invention, what I claim and desire to secure by Letters Patent is:

1. A new composition of matter for the purpose described, comprising asbestos fiber fifteen pounds, ground asbestos two hundred and thirty-five pounds, grease sixteen pounds, mussel shells six pounds, hemp fiber one-half pound, Portland cement one hundred and fifty pounds, glue one pound.

2. A composition of matter, consisting of cement one hundred and fifty pounds, a fiber binder fifteen and one-half pounds, grease sixteen pounds, mussel shells six pounds, glue one pound, and ground asbestos two hundred and thirty-five pounds.

In testimony whereof I affix my signature, in the presence of two witnesses.

JESSE W. WAGNER.

Witnesses:
F. G. FISCHER,
L. J. FISCHER.